(12) United States Patent
Poncelet et al.

(10) Patent No.: US 10,179,322 B2
(45) Date of Patent: Jan. 15, 2019

(54) APPLICATION OF HYBRID ALUMINOSILICATES

(71) Applicant: COMMISSARIAT À L'ENERGIE ATOMIQUE ET AUX ENERGIES ALTERNATIVES, Paris (FR)

(72) Inventors: Olivier Poncelet, Grenoble (FR); Antoine Thill, Fontenay aux Roses (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 48 days.

(21) Appl. No.: 15/323,630

(22) PCT Filed: Jun. 29, 2015

(86) PCT No.: PCT/EP2015/064711
§ 371 (c)(1),
(2) Date: Jan. 3, 2017

(87) PCT Pub. No.: WO2016/001148
PCT Pub. Date: Jan. 7, 2016

(65) Prior Publication Data
US 2017/0144131 A1    May 25, 2017

(30) Foreign Application Priority Data
Jul. 3, 2014 (FR) .................................. 14 56381

(51) Int. Cl.
*B01J 20/28* (2006.01)
*B01J 20/16* (2006.01)
*B01J 20/22* (2006.01)
*B01J 20/18* (2006.01)
*C01B 33/26* (2006.01)
*B01J 20/32* (2006.01)

(52) U.S. Cl.
CPC ......... *B01J 20/28021* (2013.01); *B01J 20/16* (2013.01); *B01J 20/18* (2013.01); *B01J 20/22* (2013.01); *B01J 20/28016* (2013.01); *B01J 20/3246* (2013.01); *C01B 33/26* (2013.01); *C01P 2004/13* (2013.01); *C01P 2004/34* (2013.01)

(58) Field of Classification Search
CPC ....... B01J 20/28021; B01J 20/22; B01J 20/16
See application file for complete search history.

(56) References Cited

U.S. PATENT DOCUMENTS 6,254,845 B1    7/2001 Ohashi et al.

FOREIGN PATENT DOCUMENTS

| EP | 1 112 959 A1 | 7/2001 |
| FR | 2 740 465 A1 | 4/1997 |
| FR | 2 802 912 A1 | 6/2001 |
| FR | 2 842 515 A1 | 1/2004 |
| FR | 2 864 116 A1 | 6/2005 |
| FR | 2 872 736 A1 | 1/2006 |
| IT | TO 20070765 A1 | 4/2009 |
| JP | 2002-159850 A | 6/2002 |
| JP | 2002159850 A * | 6/2002 |
| WO | 2009/114674 A1 | 9/2009 |

OTHER PUBLICATIONS

Zanzottera, Cristina et al., "Physico-Chemical Properties of Imogolite Nanotubes Functionalized on Both External and Internal Surfaces", The Journal of Physical Chemistry, 2012, vol. 116, pp. 7499-7506.
Roustaei, Abbas et al., "An evaluation of modified silica nanoparticles' efficiency in enhancing oil recovery of light and intermediate oil reservoirs", Egyptian Journal of Petroleum, 2013, vol. 22, pp. 427-433.
Shamsijazeyi, Hadi et al., "Polymer-Coated Nanoparticles for Enhanced Oil Recovery", Journal of Applied Polymer Science, 2014, 131, pp. 40576 (1 of 13).
Kumara, C.K.. et al., "Nanogibbsite: Synthesis and characterization". Journal of Colloid and Interface Science, 2010, vol. 352, pp. 252-258.
Sep. 2, 2015 Search Report issued in International Patent Application No. PCT/EP2015/064711.
Sep. 2, 2015 Written Opinion issued in International Patent Application No. PCT/EP2015/064711.
Zanzottera, Cristina, "Hybrid organic/inorganic nanotubes of imogolite type [PhD thesis]", PhD in Material Science and Technology Cycle XXIV, Mar. 2012 (Mar. 2012), pp. 1-202, XP055208942, <URL:http://porto.polito.it/2496100/1/PhD>.
Bottero, Ilaria et aL, "Synthesis and characterization of hybrid organic/inorganic nanotubes of the imogolite type and their behaviour towards methane adsorption", Physical Chemistry Chemical Physics, vol. 13, No. 2, pp. 744-750.
Bonelli, Barbara et aL, "Surface properties of alumino-silicate single-walled nanotubes of the imogolite type", Physical Chemistry Chemical Physics, 2013, vol. 15, No. 32, XP 055074059, pp. 13381-13390.

\* cited by examiner

*Primary Examiner* — Anthony J Zimmer
(74) *Attorney, Agent, or Firm* — Oliff PLC

(57) ABSTRACT

The use of hollow particles of hybrid aluminosilicates of imogolite or allophane type, characterized in that they have their external surface functionalized with Al—OH units and their internal surface functionalized at least in part with Si—R units, with R representing a nonhydrolyzable unit, preferably a hydrocarbon unit, as vehicle for one or more hydrophobic substances, in particular considered in the oil industry, the hydrophobic substances being chosen from any compound containing a linear or branched aliphatic chain having at least 4 carbon atoms, surfactants, biocides and methane clathrates inhibitors.

7 Claims, No Drawings

APPLICATION OF HYBRID ALUMINOSILICATES

The present invention relates to the application of hybrid allophones and imogolites as vehicle for hydrophobic substances.

As emerges from the following, the inventors have found that, contrary to all expectation, hollow particles of aluminosilicates of hybrid imogolite or allophane types prove to be very particularly effective as such.

Aluminosilicate polymers of imogolite and allophane type are widely known. Thus, imogolite $(OH)_3Al_2O_3SiOH$ filaments are naturally present in natural deposits mixed with allophones, which themselves are spheres of aluminosilicate of the same empirical formula and which exhibit the same chemical anisotropy. The external surface of these natural aluminosilicates is covered with Al—OH, while their internal surface is covered with Si—OH.

Both are products of great interest and can today be synthesized with different degrees of purity by different methods.

Thus, a process for obtaining an imogolite gel having a high degree of purity is described in particular in the patent application EP-A-1 112 959. This process consists in treating a mixed aluminum and silicon alkoxide with an aqueous base at a between 4 and 6.5, while maintaining the molar aluminum concentration between $5.10^{-4}$ and $10^{-2}$ M and the Al/Si molar ratio between 1 and 3, then in heating the mixture obtained in the presence of silanol groups for a period sufficient to form the fibrous aluminosilicate polymer and in removing the residual ions from the reaction medium. For its part, the U.S. Pat. No. 6,254,845 describes a process for the preparation of hollow spheres of amorphous aluminosilicate polymers. This process consists in mixing a silicon-based compound (0.01 to 1 mol/l) with an aluminum compound (0.01 to 1 mol/l) at high speed in order to form a suspension comprising precursor particles and a salt in solution (by-product), in removing a portion of said salt in solution and in subjecting the precursor particles to a heat treatment so as to obtain a porous material in the form of hollow aluminosilicate spheres. Other processes are described in FR 2 872 736, FR 2 802 912 and FR 2 740 465.

More recently, the synthesis of novel synthetic hybrid imogolites has been described (FR 2 842 515; C. Zanzottera et al., J. Phys. Chem. C, 2012, 116, 7499-7506). These products are novel as the interior of the tube is entirely carpeted with methyl units, which confers a hydrophobic nature on the cavity. The synthesis parameters make it possible to control the length of the filaments and thus the working internal volume of the imogolite tubes.

There also exists a document FR 2 842 515 describing a process for synthesizing allophanes, the internal cavity of which is only partially carpeted with hydrocarbon units. Thus, the internal surface of the sphere is covered with 50% by number of Si—OH and with 50% by number of Si—R, with R being, for example, a methyl or vinyl group. From the viewpoint of its partial functionalization with a hydrocarbon group, this type of allophane may be described as partially hybrid. It should be noted that the diameter of these hollow particles is greater than that of natural allophanes, probably a consequence of the presence of the hydrocarbon units, which are bulkier than the native hydroxyl functional groups. The applicant company has also very recently discovered that it is possible to have available totally, that is to say 100%, completely hybrid allophanes, provided that they are prepared according to a specific process, illustrated in particular in example 2 below.

However, to the knowledge of the inventors, these hybrid aluminosilicates of imogolite or allophane type have never been proposed for the purposes of vehicles for hydrophobic substances being in particular a matter of interest in the oil field.

In point of fact, the inventors have found that hybrid imogolites and allophanes prove to be particularly advantageous as such.

First of all, they can be effectively used for the trapping of hydrophobic contaminants, such as those encountered in particular in natural media of water, air and soil environment. Thus, aqueous environments, such as the marine world, as well as petroleum fluids, are unfortunately polluted by contaminants of any type and which are naturally or unnaturally generated therein.

It is thus known that, when aqueous media, containing various gas molecules, such as, for example, carbon dioxide, and hydrocarbons, such as methane, ethane, and the like, which are dissolved therein, are left at a specific temperature under a specific pressure, clathrate hydrates, which are crystals where the dissolved gas molecules are trapped in the cages of water molecules, are formed therein. These clathrate hydrates are often formed in pipelines through which oil and natural gas are produced and transported, thus blocking the pipes. This presents a serious problem in terms of safety of wells for oil and natural gas. In order to prevent the formation of clathrate hydrates, substances such as, for example, glycols or even ionic liquids (WO2009114674 A1) are conventionally introduced into the pipelines through which the hydrocarbon and the natural gas are produced and transported, in order to inhibit the growth, the agglomeration and the deposition of these. Unfortunately, these substances persist in the material thus treated and then the problem arises of their removal.

The hybrid imogolites and allophones as considered according to the invention are entirely capable of constituting an effective purification means in this regard.

As regards the petroleum fluids, the use of hybrid imogolites and allophanes as considered according to the invention proves in addition to be advantageous with regard to additional aspects and in particular in connection with the enhanced oil or also hydrocarbon recovery (EOR) techniques developed for increasing the profitability of oil wells. These techniques are based on the use of additional adjustment(s) in the extraction techniques. They are generally targeted at reducing the water/hydrocarbon interfacial tension, at detrimentally affecting the surface wettability and/or at increasing the mobility of the fluid to be extracted via an increase in the viscosity of the drilling fluid. One of these adjustments is thus based on the use of nanoparticulate materials and in particular of silica nanoparticles (A Roustaei et al., Egyptian Journal of Petroleum, (2013), 22, 427-433; H. Shamsi Jazeyi et al., J. Appl. Polym. Sci. (2014). 131, 40576). The particles of aluminosilicates considered according to the invention thus prove to be particularly advantageous for purifying these hydrocarbon fluids but also for participating in the enhanced recovery of the hydrocarbons as viscosifying agent and/or agent for modifying the wettability of the rocks.

Furthermore, they also appear to be an effective means for conveying substances of interest into this type of fluid, such as surfactants, biocides, indeed even the inhibitors of methane clathrates discussed above.

Thus, the present invention is targeted mainly at the use of hollow particles of hybrid aluminosilicates of imogolite or allophane type, characterized in that they have their external surface functionalized with Al—OH units and their internal surface functionalized at least in part with Si—R units, with R representing a nonhydrolyzable unit, preferably a hydrocarbon unit, as vehicle for one or more hydrophobic substances, in particular of interest in the oil industry, said hydrophobic substances being chosen from any compound containing a linear or branched aliphatic chain comprising at least 4 carbon atoms, surfactants, biocides and methane clathrates inhibitors.

According to a first alternative form, the hydrophobic substance is dedicated to being incorporated in a medium via said particle charged beforehand with said substance. Such a substance may in particular be a compound advantageous for enhanced oil or hydrocarbon recovery (EOR) techniques and be in particular chosen from surfactants, biocides and methane clathrates inhibitors.

According to this alternative form, the particles are preferably particles completely hybrid allophane type.

According to a second alternative form, the substance conveyed according to the invention is dedicated to being trapped and/or extracted by said uncharged aluminosilicate particle.

In the field of oil use, this substance may, for example, be a methane clathrates inhibitor. This alternative form of use may thus be compared to a purification by trapping contaminating substances.

Such a use may also be advantageous for extracting one or more undesirable fatty substances from bioreactor extraction media.

Within the meaning of the present invention, the term hybrid is intended to characterize the fact that, in contrast to conventional aluminosilicates of imogolite or allophane type, that is to say nonfunctionalized in their internal cavity, the aluminosilicates considered according to the invention have, at least in part, Si—R units, with R being a nonhydrolyzable and in particular hydrocarbon unit, in their internal cavity. In other words, the hollow particles of hybrid aluminosilicates have a cavity possessing a hydrophobic nature.

This functionalization of the Si—OH units to give Si—R units may be partial or total (100%). Within the meaning of the invention, the term hybrid covers both these embodiments.

First of all, conventional or hybrid allophones and/or imogolites display an exceptional thermal stability. This is because they are stable up to 250° C., indeed even more for the hybrids, before decomposing. This thermal resistance makes them compatible for use in drilling wells.

Furthermore, they prove to be chemically stable for a broad pH range, namely varying from 2 to 11.

Furthermore, the external surfaces of the imogolite tubes or of the allophane spheres may be easily modified by the sol-gel technique or by addition of functional or nonfunctional carboxylic acids or phosphonic acids. They may thus be specially adapted to the medium in which they will be used.

Finally, substances adsorbed inside the hydrophobic cavities of the hybrid imogolites and/or allophanes do not "desorb" in a water/ethanol mixture. The trapping thus proves to be particularly effective.

Conversely, any substance trapped within these cavities may be efficiently extracted therefrom with supercritical $CO_2$. Consequently, on completion of such an extraction, the hybrid allophane and/or imogolite particles are advantageously reusable.

According to a first alternative form of the invention, the hybrid particles are of imogolite type and the internal surface of their tube is at least partially functionalized with Si—R units.

Within the meaning of the invention, R is preferably a linear or branched $C_1$-$C_{12}$ alkyl or alkenyl group.

Preferably, R represents a methyl, ethyl, propyl, butyl and/or vinyl group and, more preferably still, R is a methyl and/or vinyl group.

The hybrid aluminosilicates of imogolite type may in particular be prepared according to the processes described in FR 2 842 515. Another preparation process is also provided in example 1 below.

100% hybrid imogolites are very particularly suitable for the invention.

According to a second alternative form, the hybrid particles are of allophane type and the internal surface of their sphere is at least partially, preferably completely, functionalized with Si—R units. The partially hybrid aluminosilicates may in particular be prepared according to the process described in FR 2 842 515.

In this alternative embodiment, particles of hybrid aluminosilicates of allophane type in which R represents a vinyl and/or methyl unit are very particularly suitable for the invention.

100% hybrid allophanes, in particular as recently prepared by the inventors and as illustrated in example 2, are also very particularly suitable for the invention.

More specifically, these 100% hybrid allophones may be prepared according to a technology comprising at least the stages consisting in:

(a) having available, at ambient temperature, an aqueous medium containing at least one aluminum precursor and a silicon alkoxide in an Al/Si molecule ratio varying from 1 to 3, (b) carrying out, with stirring, the alkaline hydrolysis of said medium with gradual addition of at least one base in a base/aluminum molar ratio of 1.5 to 3, preferably of 2.3 to 3, (c) continuing to stir at ambient temperature, on conclusion of the addition of all of the base, until said medium is obtained in the clear state, in particular for at least 6 hours, and (d) heating the solution obtained at a temperature varying from 50 to 150° C. for 2 to 8 days, stages (b) to (d) being carried out in a reactor formed of a material which is chemically inert with respect to the reactants and said expected aluminosilicate.

According to a preferred alternative form, all of the stages (a) to (d) are carried out within one and the same reactor.

More particularly, the constituent material of said reactor is devoid of silanol group and of free fluorine atom and, as such, is different from glass and Teflon. Advantageously, the constituent material of the reactor is chosen from stainless steel, polypropylene or inert porcelains, in particular according to those employed in industrial chemical reactors.

According to a preferred alternative form, the silicon alkoxide is of formula RSi(OR')$_3$ in which R' is a $C_1$ to $C_2$ alkyl group and R is a saturated or unsaturated $C_1$ to $C_2$ hydrocarbon group. More preferably, it is methyltrimethoxysilane $(OCH_3)_3SiCH_3$ and vinyltrimethoxysilane $(OCH_3)_3Si(CH=CH_2)$.

Generally, a substance is said to be hydrophobic when it exhibits a very low, indeed ever a total lack of, affinity for an aqueous medium. This lack of affinity is also reflected by a very low, indeed even a lack of, aqueous solubility. By way of indication, a compound is said to be immiscible in water if less than 3%, preferably less than 2%, for example less than 1%, by weight of this compound is in dissolved form in the water.

As regards the substances to be conveyed, they may be of very diverse natures insofar as they are directly related to the nature of the medium containing them or dedicated to containing them.

Generally, hydrocarbon substances are concerned. Within the meaning of the invention, any compound containing a linear or branched aliphatic chain comprising, at least 4 carbon atoms, for example at least 6 carbon atoms, for example at least 8 carbon atoms, for example at least 10 carbon atoms, is more specifically concerned. A lipophilic or amphiphilic compound may be concerned.

For example, it may be chosen from oils or their derivatives which are liquid at ambient temperatures, in particular between 15 and 30° C., this their derivatives which are pasty or solid at ambient temperature, in particular between 15 and 30° C., for example at 25° C.; waxes or their derivatives which are solid at ambient temperature, in particular between 15 and 30° C., for example at 25° C. This fatty substance may be chosen from mono-, di- and triglycerides of fatty acids and their methyl or ethyl esters, as is or modified (hydrogenation, hydroxylation, alkoxylation, alkylation, and the like); unsaturated and/or hydroxylated hydrocarbons, the carbon chain of which comprises at least one double or triple bond (e.g.: alkenes, alkynes and aromatic compounds); and/or hydroxylated fatty acids, the carbon chain of which comprises at least one double or triple bond (e.g.: alkenes, alkynes and aromatic compounds); fatty alcohols; fatty amines, and the like, animal oils or oils of animal origin; silicone oils; terpene compounds; synthetic resins carrying a labile proton (hydroxyl functional groups, primary and secondary amine functional groups, thiol functional groups, and the like) and/or at least one unsaturation such as, for example, resins based on polybutadiene or on polypropylene, alcohols, esters, ethers, amides which are nonaromatic or aromatic, and their mixtures.

As mentioned above, lipophilic or amphiphilic surfactants, biocides, indeed even clathrate inhibitors, may be concerned, if oil or a derived product is considered as application medium.

Other characteristics and advantages the particles according to the invention will more clearly emerge from the implementation of examples of the invention and from the examination of the appended figures, presented by way of illustration and without limitation of the scope of the invention.

Materials and Method 8 different batches of imogolite and/or of allophane and one batch of nanogibbsite were synthesized and tested.

A—Conventional imogolite $(OH)_3Al_2O_3SiOH$ obtained according to FR 2 802 912.

B—Conventional allophane $(OH)_3Al_2O_3SiOH$ obtained according to FR 2 864 116.

C—Hybrid imogolite $(OH)_3Al_2O_3SiMe$ obtained according to example 1 below.

D—Hybrid imogolite $(OH)_3Al_2O_3SiMe$ (C. Zanzottera et al., J. of Physical Chemistry C, Nanomaterials and Interfaces, 2012, vol. 116, 13, 7499-7506).

E—Hybrid allophane $(OH)_3Al_2O_3SiMe$ obtained according to example 2 below.

F—Partially hybrid (50/50) allophane $(OH)_3Al_2O_3Si_{1/2}OHSi_{1/2}CH_3$ obtained according to FR 2 842 515.

G—Partially hybrid (50/50) allophane $(OH)_3Al_2O_3Si_{1/2}OHSi_{1/2}CH=CH_2$ obtained according to FR 2 842 515.

H—Nanogibbsite (C. K. Kumura, Journal of Colloidal and Interface Sciences, 2010, 352, 252-258).

All the batches were, before use, washed with DI water and concentrated by diafiltration and ultrafiltration through a 10 kD polyethersulfone membrane (Millipore Labscale TFF system module).

The two hydrophobic substances considered for the absorption tests are pyrene and 9-phenylanthracene, All the tests are carried out in a medium charged with monovalent and divalent cations which are the conventional media of "oil muds".

The absorption of the natty compound considered is characterized in qualitative and quantitative modes.

Qualitative Mode:

The two hydrophobic compounds by analogy to the fatty substances considered for the absorption tests, namely pyrene and 9-phenylanthracene, have the advantage of being fluorescent under irradiation (at a wavelength of 350-380 nm, they emit at 420-430 nm). Thus, when the reaction medium is irradiated under UV-B radiation, it emits a blue color. This makes it possible to qualitatively observe the absorption of the aromatic compounds at the surface or inside the nanotubes and/or nanospheres. On the other hand, this method of characterization of the absorption cannot be quantitative in view of the existence of a phenomenon of quenching at a high concentration of aromatic molecules.

Quantitative Mode:

A gravimetric test is concerned. This type of test is very particularly suitable for 100% hybrid imogolites or allophanes which do not contain water trapped at the core.

Those which contain water at the core (F and G, for example, where 50% of the internal sites are covered with hydrophilic Si—OH sites capable of trapping water, or, a fortiori, the conventional allophanes and imogolites A and B, which are completely hydrophilic) may retain it up to 250° C. before collapsing. For this type of material, the protocol as described above was carried out without addition of aromatic compounds. The weight differential is thus carried out with respect to this measurement.

EXAMPLE 1

Preparation of Particles of Aluminosilicates of Imogolite Type Having a Hybrid Core (C)

30 ml of a solution of aluminosilicate, the aluminum/silicon molar ratio of which is set at 2 and the hydrolysis ratio (sodium hydroxide/aluminum molar ratio) of which is also set at 2, were prepared as follows:

An aqueous aluminum solution is prepared by dissolution of 0.487 g of aluminum perchlorate in pure water, in order to obtain a 0.1 mol·l$^{-1}$ solution, and is then decanted into a 10 ml volumetric flask.

A solution of 50 ml of 0.1 mol·l$^{-1}$ sodium hydroxide is prepared by dissolution of 0.2 g of sodium hydroxide and is then decanted into a 20 ml volumetric flask.

The aluminum perchlorate solution is decanted into a Teflon container containing a magnetic bar and is then stirred. Methyltriethoxysilane (99.6 µl) is added to the solution. The sodium hydroxide solution is subsequently added at a flow rate of 4 ml·min$^{-1}$ using a peristaltic pump. Once the addition is complete, the Teflon container is closed and left stirring at ambient temperature for a period of 20 h, and then placed in an oven at 85° C. for 5 days. The solution is subsequently washed and filtered several times in pure water using a 30 kDa membrane.

The hybrid imogolite nanotubes thus prepared were lyophilized in the solid form. A volatile white powder of very low density is obtained.

The yield of this synthesis is at least 50%.

EXAMPLE 2

Preparation of Particles of Aluminosilicates of Allophane Type Having a Hybrid Core (E)

32.46 g of $Al(ClO_4)_3 \cdot 9H_2O$ are added to 700 ml of DI water in a container made of polypropylene or of stainless steel. The medium is left stirring for ½ hour, 4.53 g of $MeSi(OMe)_3$ are subsequently added. The homogeneous reaction medium is kept stirred at ambient temperature.

A fresh sodium hydroxide solution (5.33 g of NaOH in 1333 ml of DI water) is subsequently added to a dropping funnel. Addition is carried out at the rate of 250 ml per minute. The reaction medium is clear after ¼ hour. The reaction medium is stirred at ambient temperature for 12 hours before being heated at 90° C. for 5 days in a container made it polypropylene or of stainless steel. After cooling to ambient temperature, the reaction medium is washed (diafiltered) and concentrated by ultrafiltration through a 10 kD membrane.

The yield at $(OH)_3Al_2O_3SiMe$ with respect to the aluminum introduced is 76%.

EXAMPLE 3

Test of Extraction of Hydrophobic Compounds 0.2 g of crystals of polyaromatic compounds (pyrene and 9-phenylanthracene) is dispersed in 30 ml of an aqueous solution of NaCl (20 g/l) and $CaCl_2$ (2 g/l). It should be noted that pyrene (m.p.: 150° C.) and 9-phenylanthracene 153° C.) are very sparingly soluble in water.

10 ml of a 10% by weight solution of allophone or imogolite tested are added. The reaction medium is left stirring for 5 hours. The reaction medium is subsequently centrifuged in polypropylene tubes equipped with a PVDF membrane with a cutoff threshold of 0.1 μm for the allophones and of 0.25 μm for the imogolites, in order to take into account the aspect ratio. After the centrifugation/filtration stage, the reaction medium is clear and virtually colorless. It is subsequently dialyzed against 5 liters of DI water in a Zellu Trans Roth tube made of cellulose (MWCO: 4000-6000) for 2 days. Finally, the reaction medium is evaporated to dryness and the residue is dried in an oven at 140° C. for 5 hours. The powder recovered is weighed and stored in argon.

All the experiments were carried out 3 times on samples originating from the same hatch, except for G and H, whose experiments were carried out only once on one and the same batch.

For the sample E, 2 batches E and E' were prepared and were each tested 3 times.

For H, the nanogibbsite sample, the centrifugation/filtration is carried out on 0.250 μm filters.

The extraction results are given in table 1 below.

TABLE I

| Sample | Reference weight/10 g theoretical | Organic weight extracted | Extraction yield | Fluorescence |
|---|---|---|---|---|
| A | 7.5 g | <mg | | Yes |
| B | 8.5 g | <mg | | Yes |
| C | 8 g | 0.12 g | 0.6 | Yes |
| D | 7.5 g | 0.11 g | 0.55 | Yes |
| E | 9.2 g | 0.16 g | 0.8 | Yes |
| E' | 8.9 g | 0.15 g | 0.75 | Yes |
| F | 8.5 g | 0.05 g | 0.25 | Yes |
| G | 8.3 g | 0.03 g | 0.15 | Yes |
| H | 9 g | <mg | | Yes |

Obviously, the 100% hybrid allophones and/or imogolites (C, D, E and E') have proved to be the most effective since they make it possible to obtain an extraction yield of 60%, 55%, 80% and 75% respectively.

The 50% hybrid allophones also adsorb the organic compounds hut at a reduced scale.

EXAMPLE 4

Resistance to Adsorption

The protocol of example 3 was repeated for the batches D and E while carrying out a dialysis against 5 liters of an EtOH/water (80/20 by volume) mixture before redoing another dialysis in DI water.

The results are compiled in table II below.

TABLE II

| Sample | Reference weight/10 g theoretical | Organic weight extracted | Extraction yield | Fluorescence |
|---|---|---|---|---|
| D | 7.4 g | 0.10 g | 0.5 | Yes |
| E | 8.9 g | 0.17 g | 0.85* | Yes |

*The increase observed in the extraction yield for the hybrid allophanes might originate from the secondary adsorption of alcohol.

The dialysis in an alcoholic medium does not appear to affect the extraction yield of the hybrid allophones and/or imogolites.

The invention claimed is:

1. Method for at least one of trapping and extracting hydrophobic substances, comprising the steps of:
   providing a bioreactor media containing one or more hydrophobic substances, and
   contacting said one or more hydrophobic substances with a vehicle to at least one of trap and extract said hydrophobic substances,
   wherein said vehicle comprises hollow particles of hybrid aluminosilicates of imogolite or allophane type, said hollow particles having their external surface functionalized with Al—OH units and their internal surface functionalized at least in part with Si—R units, with R representing a nonhydrolyzable unit, and
   said one or more hydrophobic substances being selected from the group consisting of compounds containing a linear or branched aliphatic chain comprising at least 6 carbon atoms, surfactants, biocides, and methane clathrates inhibitors.

2. Method according to claim 1, wherein said one or more hydrophobic substances is a methane clathrates inhibitor.

3. Method according to claim 1, wherein said particles are of imogolite type with R representing a linear or branched $C_1$-$C_{12}$ alkyl or alkenyl group.

4. Method according to claim 1, wherein said particles are of imogolite type with R representing a methyl, ethyl, propyl, butyl or vinyl group.

5. Method according to claim 1, wherein said particles are of allophane type with R representing a methyl or vinyl group.

6. Method according to claim 1, wherein said particles are 100% hybrids.

7. Method according to claim 1, wherein R represents a hydrocarbon unit.

* * * * *